US010345081B2

(12) United States Patent
Clerici

(10) Patent No.: US 10,345,081 B2
(45) Date of Patent: Jul. 9, 2019

(54) PREFORMED SHEET AND BALLISTIC-RESISTANT ARTICLE

(71) Applicant: DSM IP Assets B.V., Heerlen (NL)

(72) Inventor: Cyril Clerici, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

(21) Appl. No.: 15/758,488

(22) PCT Filed: Sep. 16, 2016

(86) PCT No.: PCT/EP2016/071967
§ 371 (c)(1),
(2) Date: Mar. 8, 2018

(87) PCT Pub. No.: WO2017/046329
PCT Pub. Date: Mar. 23, 2017

(65) Prior Publication Data
US 2018/0245887 A1 Aug. 30, 2018

(30) Foreign Application Priority Data
Sep. 18, 2015 (EP) ..................................... 15185917

(51) Int. Cl.
B32B 5/12 (2006.01)
B32B 27/32 (2006.01)
(Continued)

(52) U.S. Cl.
CPC ............. *F41H 5/0471* (2013.01); *B32B 5/12* (2013.01); *B32B 5/26* (2013.01); *B32B 7/04* (2013.01);
(Continued)

(58) Field of Classification Search
CPC ........ B32B 2260/023; B32B 2260/046; B32B 2262/0253; B32B 2307/518;
(Continued)

(56) References Cited

U.S. PATENT DOCUMENTS 4,623,574 A 11/1986 Harpell et al.
4,876,774 A 10/1989 Kavesh et al.
(Continued)

FOREIGN PATENT DOCUMENTS

EP 0 269 151 6/1988
EP 1 144 740 10/2001
(Continued)

OTHER PUBLICATIONS

International Search Report of PCT/EP2016/071967, dated Oct. 10, 2016, 3 pages.

*Primary Examiner* — Camie S Thompson
(74) *Attorney, Agent, or Firm* — Nixon & Vanderhye P.C.

(57) ABSTRACT

The invention relates to a preformed sheet comprising mono-layers from a fibrous network with fibers having a tensile strength of at least about 1.2 GPa and preferably a binder, and a separating film on at least one of its outer surfaces, the separating film having an areal density of between 1 and 10 g/m$^2$ and a surface tension of less than 35 mN/m at the surface faced to the fibrous network and the separating film has a crystallinity of between 50 and 90%.

13 Claims, 1 Drawing Sheet

(51) Int. Cl.
  *B32B 27/12* (2006.01)
  *F41H 5/04* (2006.01)
  *B32B 7/04* (2019.01)
  *B32B 5/26* (2006.01)
(52) U.S. Cl.
  CPC .............. *B32B 27/12* (2013.01); *B32B 27/32* (2013.01); *B32B 2260/023* (2013.01); *B32B 2260/046* (2013.01); *B32B 2262/0253* (2013.01); *B32B 2262/0269* (2013.01); *B32B 2262/101* (2013.01); *B32B 2262/105* (2013.01); *B32B 2262/106* (2013.01); *B32B 2307/516* (2013.01); *B32B 2307/518* (2013.01); *B32B 2307/54* (2013.01); *B32B 2307/558* (2013.01); *B32B 2307/56* (2013.01); *B32B 2307/704* (2013.01); *B32B 2307/714* (2013.01); *B32B 2307/718* (2013.01); *B32B 2307/72* (2013.01); *B32B 2307/7265* (2013.01); *B32B 2323/043* (2013.01)
(58) Field of Classification Search
  CPC .......... B32B 2307/54; B32B 2307/558; B32B 2307/704; B32B 2307/718; B32B 2307/72; B32B 27/12; B32B 27/32; B32B 5/12; B32B 5/26; B32B 5/02; B32B 7/04; B32B 2323/043; B32B 5/20; F41H 5/0471; F41H 5/0478; Y10T 428/24802
  USPC ..................................................... 428/195.1
  See application file for complete search history.

(56) References Cited

U.S. PATENT DOCUMENTS

| | | |
|---|---|---|
| 5,175,040 A | 12/1992 | Harpell et al. |
| 6,148,597 A | 11/2000 | Cook |
| 6,277,773 B1 | 8/2001 | Ward et al. |
| 2008/0206525 A1* | 8/2008 | Jacobs ...................... B32B 5/02 428/195.1 |
| 2009/0025111 A1 | 1/2009 | Bhatnagar et al. |
| 2011/0143086 A1 | 6/2011 | Ardiff et al. |

FOREIGN PATENT DOCUMENTS

| | | |
|---|---|---|
| GB | 2 042 414 | 9/1980 |
| GB | 2 164 897 | 4/1986 |
| WO | WO 1995/000318 | 1/1995 |
| WO | WO 2000/042246 | 7/2000 |
| WO | WO 2001/073173 | 10/2001 |
| WO | WO 2004/039565 | 5/2004 |
| WO | WO 2004/053212 | 6/2004 |
| WO | WO 2007/003334 | 1/2007 |
| WO | WO 2009/109632 | 9/2009 |

\* cited by examiner

PREFORMED SHEET AND BALLISTIC-RESISTANT ARTICLE

FIELD

This application is the U.S. national phase of International Application No. PCT/EP2016/071967 filed Sep. 16, 2016, which designated the U.S. and claims priority to EP Patent Application No. 15185917.0 filed Sep. 18, 2015, the entire contents of each of which are hereby incorporated by reference.

The invention relates to a preformed sheet comprising at least two mono-layers, each mono-layer containing a fibrous network with fibers having a tensile strength of at least 1.2 GPa and preferably a binder, and a separating film on at least one of its outer surfaces, the separating film, substantially free of voids or porosity, having an areal density of between 1 and 10 g/m².

In a preferred embodiment, the invention relates to an assembly of at least two preformed sheets and to a flexible ballistic-resistant article comprising said assembly or preformed sheet.

BACKGROUND AND SUMMARY

A preformed sheet is known from WO2007003334. This reference describes a preformed sheet comprising at least two mono-layers, each mono-layer preferably containing unidirectionally oriented high strength fibers having a tensile strength of at least 1.2 GPa, and preferably a binder, with a fiber direction in each mono-layer being rotated with respect to the fiber direction in an adjacent mono-layer, and a separating film on at least on one of its outer surfaces, wherein the separating film has an areal density of between 1 and 5 g/m².

A drawback of the preformed sheet known from the prior art is that the ballistic protection against 9 mm bullets, expressed as the 9 mm $V_{50}$ of a ballistic-resistant article comprising said sheets, after immersion or soaking in a liquid such as JP8 fuel as well as in seawater, significantly degrades. For certain applications a higher retention of ballistic properties after immersion in JP8 fuel (jet fuel specified by the standard MIL-DTL-83133) and also in seawater is of great importance.

US2009/0025111 describes a flexible ballistic resistant composite material that has improved resistance to pick-up of water and other liquids, the composite material comprising a plurality of non-woven fibrous layers, the fibrous layers comprising a network of high tenacity fibers selected from the group consisting of aramid fibers, extended chain polyethylene fibers, rigid rod fibers and blends thereof, the fibers being in a binder comprising a thermoplastic polyurethane resin. Still, the 9 mm $V_{50}$ retention after immersion in JP8 fuel or seawater could be improved.

US2011/0143086 describes a ballistic resistant fabrics and articles that retain superior ballistic resistance performance after exposure to liquids such as seawater and organic solvents, such as gasoline and other petroleum-based products. The fabrics are formed from high performance fibers coated with a nitrile rubber binder polymer having an acrylonitrile content of from about 15 wt. % to about 50 wt. %. However, the processing of nitrile rubber binders is extremely difficult and negatively related to safety, environment and health issues.

There is thus a constant need in industry for a preformed sheet that enables making of ballistic-resistant articles offering a higher protection level after soaking of the article in liquids such as JP8 fuel and sea water, or alternatively for a preformed sheet that enables making of ballistic-resistant articles with a higher retention of the article after immersion or soaking in those media.

According to the invention, this is provided by a preformed sheet, wherein the separating film has surface tension of less than 35 mN/m at the surface faced to the fibrous network and a crystallinity of between 50 and 90%.

A preformed sheet according to the invention enables making of ballistic-resistant articles with a higher retention of the article after soaking in JP8 fuel and seawater. With "retention after soaking in JP8 fuel and seawater" in this application is meant the retention after soaking in JP8 fuel as well as after soaking in seawater.

With ballistic-resistant articles are meant shaped parts, comprising an assembly of at least two preformed sheets according to the invention or just one preformed sheet according to the invention, which can be used as, for example, protective clothing or for armouring of vehicles, and which offer protection against ballistic impacts such as by bullets and ballistic fragments.

DETAILED DESCRIPTION

Figure 1:
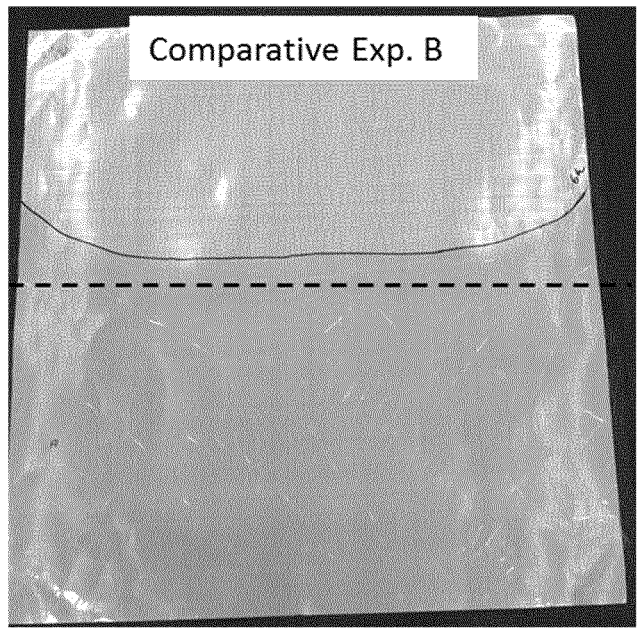
FIG. 1 is a photograph of an assembly that has been soaked half way down for 6 hours in seawater whereby the dotted line therein represents the immersion limit and the plain line therein shows the limit between dry area (top/white) and completely soaked area (bottom/grey) on the sheet.

A fibrous network in this application comprises fibers arranged in a network of various configurations. For example, fibers can be made into various different alignments from twisted or untwisted yarn bundles. Suitable examples include a knitted or woven (plain, twill, basket, satin or other weave) fabric, or non-woven structures like a felt or a layer of unidirectionally oriented fibers. In view of ballistic performance, network configurations wherein the high-strength fibers are mainly oriented in one direction are preferred. Examples hereof not only include layers of unidirectionally oriented fibers, but also woven structures wherein the high-strength fibers form a major part of the woven; e.g. as the warp fibers, and wherein the weft fibers form a minor part and need not be high-strength fibers; like the constructions described in EP 1144740 B1 or other wovens referred to as uniweave fabrics.

The fibrous network contains unidirectionally oriented high strength fibers having a tensile strength of at least 1.2 GPa. Preferably, the unidirectionally oriented fibers have a tensile modulus of at least 40 GPa. This gives preformed sheets having an even better ballistic performance.

A preformed sheet comprises at least two mono-layers of preferably unidirectionally oriented fibers, with a fiber direction in each mono-layer being rotated with respect to the fiber direction in an adjacent mono-layer, and the at least two mono-layers being linked or attached to one another. The angle of rotation, which means the smallest angle enclosed by the fibers of the adjacent mono-layers, is between 0° and 90°. Preferably, the angle is between 45° and 90°. Most preferably, the angle is between 80° and 90°. Ballistic-resistant articles in which the fibers in the adjacent monolayers are at such an angle to one another have better antiballistic characteristics.

The term mono-layer refers to a layer containing a fibrous network. In a special embodiment, the term mono-layer refers to a layer of unidirectionally oriented fibers and preferably a binder that basically holds the unidirectionally oriented fibers together. However, instead of a binder, the fibers could also be fused together. Fusion of filaments of ultra-high molecular weight polyolefin is known as such and is for instance described in U.S. Pat. No. 6,277,773, WO 2004/053212, U.S. Pat. Nos. 6,148,597 and 4,876,774.

The term fiber comprises not only a monofilament but, inter alia, also a multifilament yarn or flat tapes. The term unidirectionally oriented fibers refers to fibers that, in one plane, are essentially oriented in parallel.

For a flat tape, the width of the preferably is between 2 mm and 100 mm, more preferably between 5 mm and 60 mm, most preferably between 10 mm and 40 mm. Thickness of the flat tape preferably is between 10 µm and 200 µm, more preferably between 25 µm and 100 µm. The flat tape may be composed of a single member of one material, but may also comprise unidirectionally oriented fibers and optionally a binder.

The fibers in the preformed sheet of the invention are high strength fibers and preferably have a tensile strength of at least 1.2 GPa; and preferably a tensile modulus of at least 40 GPa. The fibers may be inorganic or organic fibers. Suitable inorganic fibers are, for example, glass fibers, carbon fibers and ceramic fibers.

Suitable organic fibers with such a high tensile strength are, for example, aromatic polyamide fibers (also often referred to as aramid fibers), especially poly(p-phenylene teraphthalamide), liquid crystalline polymer and ladder-like polymer fibers such as polybenzimidazoles or polybenzoxazoles, esp. poly(1,4-phenylene-2,6-benzobisoxazole) (PBO), or poly(2,6-diimidazo[4,5-b-4',5'-e]pyridinylene-1,4-(2,5-dihydroxy)phenylene) (PIPD; also referred to as M5) and fibers of, for example, polyolefins, polyvinyl alcohol, and polyacrylonitrile which are highly oriented, such as obtained, for example, by a gel spinning process. The fibers preferably have a tensile strength of at least 2 GPa, at least 2.5 or even at least 3 GPa. Highly oriented polyolefin, aramid, fibers, or a combination of at least two thereof are preferably used. The advantage of these fibers is that they have very high tensile strength, so that they are in particular very suitable for use in lightweight ballistic-resistant articles.

Suitable polyolefins are in particular homopolymers and copolymers of ethylene and propylene, which may also contain small quantities of one or more other polymers, in particular other alkene-1-polymers.

Good results are obtained if linear polyethylene (PE) is selected as the polyolefin. Linear polyethylene is herein understood to mean polyethylene with less than 1 side chain per 100 C atoms, and preferably with less than 1 side chain per 300 C atoms; a side chain or branch generally containing at least 10 C atoms. The linear polyethylene may further contain up to 5 mol % of one or more other alkenes that are copolymerisable therewith, such as propene, butene, pentene, 4-methylpentene, octene. Preferably, the linear polyethylene is of high molar mass with an intrinsic visocosity (IV, as determined on solutions in decalin at 135° C.) of at least 4 dl/g; more preferably of at least 8 dl/g. Such polyethylene is also referred to as ultra-high molar mass polyethylene (UHPE). Intrinsic viscosity is a measure for molar mass (also called molecular weight) that can more easily be determined than actual molar mass parameters like $M_n$ and $M_w$.

High performance polyethylene (HPPE) fibers consisting of UHPE filaments that have been prepared by a gel spinning process, such as described, for example, in GB 2042414 A or WO 01/73173, are preferably used. A gel spinning process essentially consists of preparing a solution of a linear polyethylene with a high intrinsic viscosity, spinning the solution into filaments at a temperature above the dissolving temperature, cooling down the filaments to below the gelling temperature, such that gelling occurs, and stretching the filaments before, during or after the removal of the solvent.

The term binder refers to a material that preferably holds the fibers in a monolayer together and more preferably binds the at least two monolayers together. The binder may enclose the fibers in their entirety or in part, such that the structure of the mono-layer is retained during handling and making of preformed sheets. The binder can have been applied in various forms and ways; for example as a film, as a transverse bonding strip or as transverse fibers (transverse with respect to the unidirectional fibers), or by impregnating and/or embedding the fibers with a binder, e.g. with a polymer melt, a solution or a dispersion of a polymeric material in a liquid. Preferably, the binder is homogeneously distributed over the entire surface of the mono-layer, whereas a bonding strip or bonding fibers can be applied locally. Suitable binders are thermoplastic polymers or thermosetting resins. Examples of these are polyurethanes, polyvinyls, polyacrylics, polyolefins or thermoplastic elastomeric block copolymers such as polyisoprene-polyethylene-butylene-polystyrene or polystyrene-polyisoprene-polystyrene block copolymers. Preferably the binder consists essentially of a thermoplastic polyolefin, like polybutadiene, polyisoprene, natural rubber, ethylene-propylene copolymers, ethylene-propylene-diene terpolymers, which preferably substantially coats the individual filaments of said fibers in a monolayer, and preferably has a tensile modulus (determined in accordance with ASTM D638, at 25° C.) of less than about 40 MPa. Such a binder results in high flexibility of a mono-layer, and of an assembly of preformed sheets. The advantage of preformed sheet with a binder, which is a thermoplastic polyolefin, is a higher retention of ballistic properties after soaking seawater. It was found that very good results in retention are obtained if the binder in the mono-layers and preformed sheet is a Styrene Ethylene Butylene Styrene Copolymer, (SEBS) sold e.g. under the trademark KRATON® commercially produced by Kraton, or Styrene Isoprene Styrene (SIS).

The preformed sheet of the invention comprises a separating film on at least one of its outer surfaces. The separating film has an areal density of between 1 and 10 g/m², a surface tension of less than 35 mN/m at the surface faced to the fibrous network and a crystallinity of between 50 and 90%. Preferably the separating film has a crystallinity of between 52 and 80%, more preferably between 54 and 70%. The separating film is typically non-fibrous. The separating film is different from the monolayer. The separating film is different from any binder. The separating film is preferably biaxially oriented. Said film may be for example a polyolefin such as e.g. polyethylene or polypropylene, film. These films are dense films substantially free of voids or porosity. Films that are substantially free of voids and without any porosity enable making of ballistic-resistant articles offering a higher protection level after soaking of the article in JP8 fuel or sea water. Preferably the preformed sheet of the invention comprises said separating film on both of its outer surfaces.

The separating film is a preferably made from a polyolefin, more preferably a high density polyethylene or a polypropylene. In a preferred embodiment, the separating film is essentially made from a high molar mass polyethylene, more preferably form an ultra-high molar mass polyethylene (UHPE) of intrinsic viscosity, IV, at least 4 dl/g. Such a film may be produced according to a process as disclosed in GB2164897. In another preferred embodiment, the separating film is a biaxially stretched polypropylene (BOPP) film, more preferably an at least 4×biaxially-stretched film, most preferably a 10 to 100×biaxially-stretched film. A 10 to 100×biaxially-stretched film is herein understood to be a film, which is stretched in two perpendicular directions such that the surface of the film increased by a factor 10 to 100. An advantage of biaxially-stretched films is that an even higher protection level at a certain weight can be obtained.

Stretch ratios in said two perpendicular directions, generally referred to as machine and transverse direction, may be equal, however other ratios may also be chosen. Preferably the stretch ratio in machine to transverse direction varies from 1:1 to 1:3, more preferably from 1:1 to 1:2, more preferably from 1:1 to 1:1.5. Preferably, the film is at least 20×biaxially stretched, at least 30×, or even at least 40×. More preferably, biaxially-stretched films made from polyethylene, especially UHPE, polypropylene are applied in the sheets. These films are commercially available from several suppliers, such as e.g. Treofan. Such films have relatively high tensile strength and modulus, which may contribute to lower deformation of the preformed sheet upon impact. Tensile properties are preferably expressed per width of film (e.g. in N/m) and not per cross-section (like N/m$^2$). Preferably, therefore, the separating film has a tensile strength per width of film (herein also called strength factor) of at least 150 N/m, at least 200, or even at least 250 N/m. In case of films with high elongation at break (for example greater than 20%) the yield strength is preferably taken as reference rather than strength at break. Tensile modulus per width of film is preferably at least 3000 N/m, at least 4000, or even at least 5000 N/m.

The best results were obtained with a preformed sheet wherein the separating film has an areal density of between 1 and 10 g/m$^2$. Such films show generally relatively high strength and modulus, and high abrasion resistance. Commercially available BOPP films, like e.g. the Treofan PHD 3.5 (from Treofan Germany GmbH), films used in state of the art preformed sheets, e.g. in WO2007/003334, are corona treated at the surface faced to the fibrous network in order to provide a good adhesion between the film and the binder. The corona treatment on the film however, results in a surface tension of more than 37 mN/m. Films used in the preformed sheet of the invention are not corona treated and consequently have a surface tension of less than 36 mN/m, preferably less than 32 mN/m, more preferably less than 30 mN/m, measured with DIN ISO 8296 at the surface faced to the fibrous network. Generally the surface tension of the film for use in the preformed sheet is between 36 and 25 mN/m, preferably between 35 and 30 mN/m. The measurement of the surface tension being carried out after the film has been removed from the preformed sheet.

The crystallinity of the film can be derived from a DSC measurement, as explained herein after.

The preformed sheet according to the invention comprises at least two mono-layers containing unidirectionally oriented fibers. In general, the preformed sheet comprises 2, 4 or another multiple of 2 perpendicularly oriented mono-layers. Preferably, the preformed sheet of the invention comprises at least two mono-layers of unidirectionally oriented fibers combined with a biaxially-stretched film having an areal density of between 1 and 10 g/m$^2$. A preformed sheet with 2 or 4 mono-layers of unidirectionally oriented fibers combined with biaxially-stretched films on both outer surfaces turned out to give the best ballistic protection after soaking in JP8 fuel or sea water.

The invention further relates to an assembly of at least two preformed sheets according to the invention. Preferably the sheets are substantially not linked to one another. Preferably adjacent preformed sheets in the assembly are able to move laterally with respect to one another. With increasing number of preformed sheets, the ballistic protection level is improved, but the weight of the assembly increases, and the flexibility decreases. In order to obtain a maximum flexibility, adjacent sheets in an assembly preferably are not linked to one another. However, to achieve some level of coherence the assembly of preformed sheets may, for example, be stitched through. The assembly is typically a ballistic resistant assembly. Depending on the ballistic threat and the level of protection desired, the skilled person can find an optimum in the number of sheets by some experimentation.

The separating sheet preferably separates a monolayer in the preformed sheet of which it is part from an adjacent preformed sheet in the assembly. Preferably a separating sheet of one preformed sheet is in abutting contact with a separating sheet of an adjacent preformed sheet in the assembly.

Further advantages of the ballistic-resistant assembly according to the invention, are found in applications in which, in addition to a light weight a high protection level after soaking in fuel or seawater is obtained.

It was found that a suitable ballistic protection level after soaking in fuel and seawater at a suitable weight of the assembly is achieved if the weight of the preformed sheets has a particular maximum value. Preferably, the weight, or areal density of the preformed sheet in the ballistic-resistant articles in a flexible application, such as a ballistic resistant vest, is at most 500 g/m$^2$, the fiber content of each mono-layer being between 10 and 150 g/m$^2$. More preferably, the weight of the preformed sheet is at most 300 g/m$^2$, the fiber content of each mono-layer being between 10 and 100 g/m$^2$.

The ballistic-resistant assembly can, in principle, be fabricated by any known suitable method, for example in accordance with processes described in WO 95/00318, U.S. Pat. No. 4,623,574, or 5,175,040. A mono-layer is produced, for example, by fibers, preferably in the form of continuous multifilament yarns, being guided from a bobbin frame across a comb, as a result of which they are oriented in parallel in a plane. A number of monolayers is laid with an angle of rotation, preferably at an angle of about 90°, on top of one another, and a separating film is placed on at least one of both surfaces (on top of and/or below the stacked monolayers), a preformed sheet being formed in the process. Preferably the preformed sheet is consolidated using known techniques; this may for example be done discontinuously by compressing a stack in a mould, or continuously via laminating and/or calendering steps. During consolidation, such conditions as temperature, pressure and time are chosen, that all layers at least partly adhere to each other, preferably without melting the separating film. Higher adherence can be obtained by varying temperature, pressure and/or time, whereby a skilled man can establish detailed conditions through routine experiments.

If a matrix material is applied as binder, the matrix material may thus be made to flow between the fibers and to adhere to the fibers of the under- and/or overlying mono-layers, and optionally to the separating film. If a solution or a dispersion of the matrix material is employed, the process of forming the monolayers into a multi-layer sheet also comprises a step of evaporating the solvent or dispersant, generally before the steps of placing separating film layers and consolidation. Then the preformed sheets are stacked to produce an assembly, which in turn can be applied to make a ballistic-resistant article, with the option of stabilizing the assembly by for example local stitching or enveloping the stack with a flexible cover.

It was found that, with a view to obtaining a low binder content, especially a low matrix material content, it is advantageous to use a method in which the mono-layer is produced by wetting yarns having a count of yarn (or titer) of between 200 and 5000 dtex with a dispersion of the matrix material and an optional filler. Yarns having a count of yarn less than 200 dtex absorb comparatively little matrix material from the dispersion. Preferably, the count is greater than 500 dtex, more preferably greater than 800 dtex, even more preferably greater than 1000 dtex and most preferably greater than 1200 dtex. The count of yarn is preferably lower than 5000 dtex, more preferably lower than 2500 dtex because these yarns can be spread more readily in the plane of the monolayer.

Preferably, an aqueous dispersion of a matrix material is used. An aqueous dispersion has a low viscosity, which has the advantage that the matrix material is very uniformly distributed over the fibers, and good, homogeneous fiber-fiber bonding being achieved as a result. A further advantage is that the dispersant water is non-toxic and can therefore be evaporated in the open air. Preferably, the dispersion, likewise with a view to obtaining a uniform distribution at the low matrix percentage aimed for, contains between 30 and 60 mass % of solid components, i.e. a matrix material, preferably an elastomeric matrix, material and the optional filler, relative to the total mass of the dispersion.

The ballistic-resistant assembly according to the invention, obtainable according to the methods described above, shows even before soaking very good ballistic properties as expressed by $V_{50}$. Preferably, the assembly according to the invention, or the preformed sheet has a $V_{50}$ of at least 600 m/s against 9 mm, 124 grain Full Metal Jacketed (FMJ) Remington bullets, at an areal density equal or less than 4.75 kg/m$^2$. Generally the areal density of the assembly according to the invention will be at least 0.75 kg/m$^2$, preferably the areal density of the assembly according to the invention will be at least 1.5 kg/m$^2$. The $V_{50}$ is the velocity at which the probability of the bullets or ballistic fragments penetrating through the ballistic structure is 50%.

The invention more specifically relates to a ballistic-resistant article comprising an assembly according to the invention, or a preformed sheet according to the invention, the assembly or the preformed sheet having an areal density equal or less than 4.75 kg/m$^2$ and $V_{50}$ of at least 600 m/s against 9 mm and the article has a 9 mm $V_{50}$ retention after 24 hours soaking in salt water, and after 4 hours in JP8 fuel of at least 85%, preferably 87%, more preferably 90%. Preferably the 9 mm $V_{50}$ retention of the article after 24 hours soaking in salt water is at least 88%, preferably 90% and the 9 mm $V_{50}$ retention after 4 hours soaking in JP8 fuel of at least 92%. Generally, the ballistic article comprises an envelope holding the assembly or the preformed sheet. Preferably, the article has an areal density less than 4.4 kg/m$^2$, or more preferably less than 4.1 kg/m$^2$.

The invention further relates to the use of a separating film in the manufacturing of a flexible ballistic-resistant article comprising a fibrous network with fibers having a tensile strength of at least about 1.2 GPa, wherein the separating film is a biaxially stretched polypropylene film with an areal density of between 1 and 10 g/m$^2$, a surface tension of less than 35 mN/m at the surface faced to the fibrous network and a crystallinity of between 50 and 90%.

The invention is further explained by means of the following examples, without being limited thereto.

Test Methods as Referred to in the Present Application, are as Follows:

IV: the Intrinsic Viscosity is determined according to method ASTM D1601 at 135° C. in decalin, the dissolution time being 16 hours, with DBPC as antioxidant in an amount of 2 g/l solution, by extrapolating the viscosity as measured at different concentrations to zero concentration;

Side chains: the number of side chains in a UHPE sample is determined by FTIR on a 2 mm thick compression moulded film, by quantifying the absorption at 1375 cm$^{-1}$ using a calibration curve based on NMR measurements (as e.g. in EP 0269151);

Tensile properties (measured at 25° C.): tensile strength (or strength), tensile modulus (or modulus) and elongation at break (or eab) are defined and determined on multifilament yarns as specified in ASTM D885M, using a nominal gauge length of the fiber of 500 mm, a crosshead speed of 50%/min. On the basis of the measured stress-strain curve the modulus is determined as the gradient between 0.3 and 1% strain. For calculation of the modulus and strength, the tensile forces measured are divided by the titre, as determined by weighing 10 meters of fiber; values in GPa are calculated assuming a density of 0.97 g/cm$^3$. Tensile properties of thin films were measured in accordance with ISO 1184(H).

Surface tension of the film is measured according measured with DIN ISO 8296 after the film has been removed from the sheet after soaking long enough in water to remove the film. As the abovementioned method for measuring the surface tension, in the art pens are used filled with solvents with different surface tension, the method consequently generally results in a range (more than, or less than a certain value) rather than a discrete value.

An indication of the surface tension of the surface faces to the fibrous network is the weight gain of the assembly or the preformed sheet after 24 hours soaking in water. A surface tension more than 35 mN/m generally corresponds with a weight gain of at least 40% For films with a surface tension lower than 35 mN/m the weight gain generally remains below 25%

As water substantially penetrates from the edges of the assembly or the preformed sheet, a visual observation of water level already shows the difference between a high and a low surface tension. With a surface tension more than 35 mN/m the surface soaked in water half way for 6 hours is wetted for more than 80%, generally up to 100%. For films with a surface tension lower than 35 mN/m the water penetration in the performed sheet immersed half way for 6 hours remains around the edges and is generally not more than 40% of the soaked surface.

Crystallinity was measured by Differential Scanning calorimetry (DSC), with a Mettler-Toledo DSC equipment. The measurement takes place in nitrogen, with a flow rate of 50 ml/min, and the heating/cooling rate was fixed at 10° C./min from 0° C. to 200° C. Crystallinity of the given polymer film sample is calculated with the heat of fusion of the first heating measured with the DSC experiment divided by the heat of fusion of the given 100% crystalline polymer film. The heat of fusion of 100% crystalline polymers (in J/g) references are taken from the publication by B. Wunderlinch, *Thermal Analysis, Academic Press*, 1990, pp. 417-431 or TN 48, *"Polymer Heats of Fusion"*, TA Instruments, New Castle, Del. For polyethylene the heat of fusion of al 00% crystalline film is 293 J/g; for polypropylene this is 207 J/g.

Ballistic sample correspond to a 38 cm by 38 cm squares 55 stacked plies of sheet material stitched through at the corners, and covered in a 40 cm by 40 cm squares heat sealed Nylon ripstop carrier. Ambient ballistic performance of a sample was measured by subjecting the sample to shooting tests performed with 9 mm, 124 grain Full Metal Jacketed (FMJ) Remington, hereinafter 9 mm, following the standard test conditions of MIL-STD-662F. The ballistic resistance of the different materials sample was also evaluated after immersion to salt water and JP8 fuel with 9 mm, respectively.

24-hour salt water immersion test was done as follows: Seawater is presented by a salt water solution, which is composed of distilled water in which 3.0 mass % Sodium Chloride and 0.5 mass % Magnesium Chloride were dissolved. The heat sealed ripstop carrier was cut through completely along the top edge and bottom edge of the heat seal without cutting into the ballistic fiber. Samples were completely immersed vertically into the sea water/salt water solution, with the top edge at least 100 mm below the surface of the salt water solution, and with at least 50 mm of clearance around the panel for a minimum of 24 hours. The salt water solution temperature was 21° C. The samples were then taken out of the salt water solution and let free-hanging to drip for 15 minutes prior to the ballistic test. The shooting test then started within 5 minutes to determine the $V_{50}$ ballistic performance with 9 mm according to the same shooting protocol and standard test conditions of MIL-STD-662F. The $V_{50}$ was calculated using 3 lowest complete penetration velocities and 3 highest partial penetration velocities.

4-hour JP8 fuel immersion test was done as follows: JP8 is a jet fuel specified by the standard MIL-DTL-83133. The heat seal cover was cut through completely along the top edge and bottom edge of the heat seal without cutting into the ballistic fiber. Samples were completely immersed vertically into the JP8 fuel, with the top edge at least 100 mm below the surface of the JP8 fuel, and with at least 50 mm of clearance around the panel for a minimum of 4 hours. The JP8 fuel temperature was 21° C. The samples were then taken out of the JP8 fuel and let free-hanging to drip for 15 minutes prior to the ballistic test. The shooting test then started within 5 minutes to determine the $V_{50}$ ballistic performance with 9 mm according to the same shooting protocol and standard test conditions of MIL-STD-662F. The $V_{50}$ was calculated using 3 lowest complete penetration velocities and 3 highest partial penetration velocities.

COMPARATIVE EXPERIMENT A

A unidirectional monolayer was formed from UHMWPE fibers. The yarns, as commercially available from DSM Dyneema in the Netherlands with a tensile strength of 4.1 GPa, were oriented in parallel and held together by about 17 mass % (of the total mass of the monolayer) of a polyurethane elastomeric matrix material as described in the examples of WO04039565 A1. A sheet was produced by using 2 stacked unidirectional monolayers in a 0-90° orientation, containing two 7 μm thick polyethylene (LDPE) films sandwiching the stack of 2 monolayers, laminated together resulting in a sheet having an areal density (AD) of 80 g/m². The polyethylene film had a crystallinity of about 45%.

COMPARATIVE EXPERIMENT B

Comparative Experiment A was repeated, but now the resin matrix was a based on Kraton D1107 (polystyrene-polyisoprene-polystyrene block copolymer thermoplastic elastomer) and the separating film a biaxially stretched polypropylene film, having a crystallinity of about 55% and a surface tension of the side applied to the stack of monolayers of more than 37 mN/m, has a thickness of 10 μm (Treofan PHD10).

FIG. 1 shows a picture of the assembly that has been soaked half way down 6 hours in seawater. The dotted line represents the immersion limit. The plain line shows the limit between dry area (top/white) and completely soaked area (bottom/grey) on the sheet. About 90% of the immersed surface is soaked with water,

EXAMPLE 1

Comparative Experiment B was repeated, but now the 10 μm polypropylene separating film had the surface tension of the side applied to the stack of monolayers of less than 35 mN/m. Ambient $V_{50}$ values where equal to that of Comparative Experiment B. The observed $V_{50}$ retention after immersion in JP8 was 89%, significantly higher than that of Comparative Experiment A. In addition, $V_{50}$ retention after immersion in salt water solution was 92%, significantly higher than those of Comparative Experiment A and Comparative Experiment B.

Figure 2:
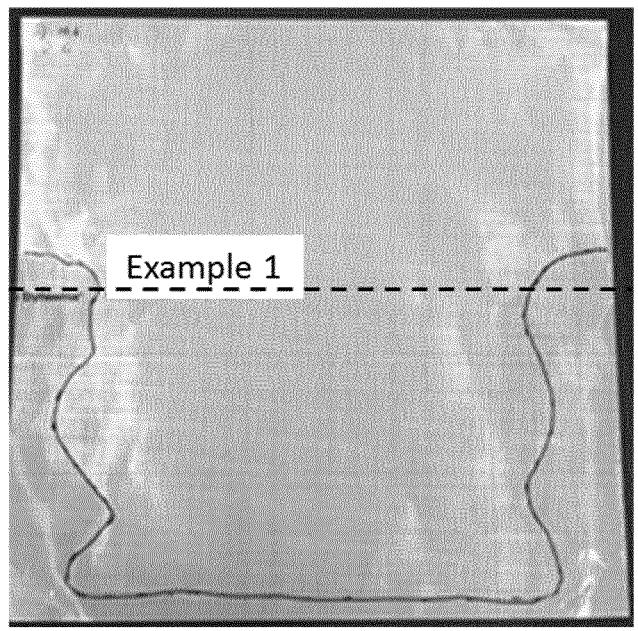
FIG. 2 is a photograph of an assembly that has been soaked half way down for 6 hours in salt water solution whereby the dotted line therein represents the immersion limit and the plain line therein shows the limit between dry area (white) and completely soaked area (grey) on the sheet.

FIG. 2 shows a picture of the assembly that has been soaked half way down for 6 hours in salt water solution. The dotted line represents the immersion limit. The plain line shows the limit between dry area (white) and completely soaked area (grey) on the sheet. The surface soaked with water is about 25%. Table 3 shows that the weight gain of an assembly according to the invention is lower than 25%.

The overall ballistic performance of panel composed of a given material is defined by the lowest performance to one of the given threats. Consequently, Example 1 is seen having the greatest ballistic resistance compared to the Comparative Experiment A and B. At a given number of sheets, here being 55, Example 1 has a similar $V_{50}$ in ambient condition than that of both Comparative Experiments, as seen in Table 1. However, the results in Table 2 clearly show the improved ballistic performance expressed in $V_{50}$ retention. After 4 hours JP8 fuel immersion the $V_{50}$ retention of Example 1 is at least 89%. After 24 hours soaking in salt water solution the $V_{50}$ retention is at least 92%.

TABLE 1

| Example | Polymeric Binder | Film | Film Thickness μm | Film surface tension mN/m | AD sheet g/m2 | AD panels kg/m2 | 9 mm Dry ballistic performance m/s | Relative V50 |
|---|---|---|---|---|---|---|---|---|
| CEA | PUR | LDPE | 7 | <37 | 80 | 4.4 | 614 | 100% |
| CEB | Kraton | BOPP | 10 | >37 | 85.5 | 4.71 | 598 | 98% |
| E1 | Kraton | BOPP | 10 | <35 | 85.5 | 4.71 | 603 | 99% |

TABLE 2

| | Performance after JP8 Immersion | | Performance after Salt Water Immersion | |
|---|---|---|---|---|
| Example | 9 mm V50 m/s | 9 mm V50 retention % | 9 mm V50 m/s | 9 mm V50 retention % |
| CEA | 472 | 77% | 534 | 87% |
| CEB | 532 | 89% | 501 | 84% |
| E1 | 543 | 90% | 556 | 92% |

TABLE 3

| Example | Weight gain after 24 hours in salt water solution % |
|---|---|
| CEA | 27% |
| CEB | 44% |
| E1 | 22% |

The invention claimed is:

1. A preformed sheet comprising at least two mono-layers, wherein each mono-layer comprises:
   a fibrous network comprised of fibers having a tensile strength of at least 1.2 GPa and a binder, and
   a separating film on at least one outer surface of the mono-layers, wherein
   the separating film is substantially free of voids or porosity and exhibits (i) an areal density of between 1 and 10 g/m$^2$, (ii) a surface tension of less than 35 mN/m at a surface of the separating film facing the fibrous network and (iii) a crystallinity of between 50 and 90%.

2. The preformed sheet according to claim 1, wherein the mono-layer comprises a layer of unidirectionally oriented fibers.

3. The preformed sheet according to claim 2, wherein a fiber direction of one mono-layer is rotated relative to a fiber direction of an adjacent mono-layer.

4. The preformed sheet according to claim 1, wherein the fibers comprise ultra-high molar mass polyethylene.

5. The preformed sheet according claim 1, wherein the binder is a thermoplastic polyolefin.

6. The preformed sheet according claim 1, wherein the binder is styrene ethylene butylene styrene copolymer (SEBS) or styrene isoprene styrene (SIS).

7. The preformed sheet according to claim 1, wherein the separating film is a biaxially stretched polyolefin film.

8. The preformed sheet according to claim 7, wherein the separating film is a biaxially stretched polypropylene (BOPP) film.

9. An assembly which comprises at least two of the preformed sheets according to claim 1.

10. A ballistic-resistant article comprising at least one assembly according to claim 9.

11. The ballistic-resistant article according to claim 10, wherein the assembly has an areal density less than 4.75 kg/m$^2$ and V50 of at least 600 m/s against 9 mm, wherein the article has a 9 mm V50 retention after 24 hours soaking in salt water, and after 4 hours in JP8 fuel of at least 85%.

12. A ballistic-resistant article comprising at least one preformed sheet according to claim 1.

13. The ballistic-resistant article according to claim 12, wherein the at least one preformed sheet has an areal density less than 4.75 kg/m$^2$ and V50 of at least 600 m/s against 9 mm, wherein the article has a 9 mm V50 retention after 24 hours soaking in salt water, and after 4 hours in JP8 fuel of at least 85%.

* * * * *